(12) United States Patent
Curran et al.

(10) Patent No.: US 6,298,881 B1
(45) Date of Patent: Oct. 9, 2001

(54) MODULAR FLUID HANDLING ASSEMBLY AND MODULAR FLUID HANDLING UNITS WITH DOUBLE CONTAINMENT

(75) Inventors: William J. Curran, Saratoga, CA (US); Hiromi Dick Shigemoto, Round Rock, TX (US); John Annett, Pleasent; Lope M. Amores, Fremont, both of CA (US)

(73) Assignee: Shigemoto & Annett II, Inc., Elgin, TX (US)

( * ) Notice: Subject to any disclaimer, the term of this patent is extended or adjusted under 35 U.S.C. 154(b) by 0 days.

(21) Appl. No.: 09/270,711

(22) Filed: Mar. 16, 1999

(51) Int. Cl.$^7$ ..................................... F16K 11/02
(52) U.S. Cl. ........................... 137/884; 285/924
(58) Field of Search ................... 137/884, 269, 137/271, 312

(56) References Cited

U.S. PATENT DOCUMENTS

| | | |
|---|---|---|
| 4,019,371 | 4/1977 | Chaplin et al. . |
| 4,253,482 | 3/1981 | Stephens . |
| 4,430,927 | 2/1984 | Turnbull . |
| 4,476,897 | 10/1984 | Morrill . |
| 4,921,072 | 5/1990 | Divisi . |
| 5,090,871 | 2/1992 | Story et al. . |
| 5,170,659 | 12/1992 | Kemp . |
| 5,197,766 | 3/1993 | Glover et al. . |
| 5,368,648 | 11/1994 | Sekizuka . |
| 5,394,903 | 3/1995 | Tominaga . |
| 5,419,360 | 5/1995 | Lechevalier . |
| 5,605,179 | 2/1997 | Strong, Jr. et al. . |
| 5,725,022 | 3/1998 | Taka et al. . |
| 5,832,956 | 11/1998 | Nimberger . |
| 5,836,355 | 11/1998 | Markulec et al. . |
| 6,000,422 | * 12/1999 | Shigemoto ........................... 137/312 |

* cited by examiner

*Primary Examiner*—John Fox
(74) *Attorney, Agent, or Firm*—Fitzpatrick, Cella, Harper & Scinto

(57) ABSTRACT

A modular fluid handling assembly includes a plurality of fluid handling units. Each fluid handling unit includes a fluid passage and associated port, a vacuum passage and associated port, a vacuum pressure source, and a containment seal. The fluid passage ports and vacuum passage ports of adjacent fluid handling units respectively communicate. The containment seal is disposed between adjacent fluid handling units and surrounds the communicating fluid passage ports and vacuum passage ports. The vacuum pressure source is in continuous communication with the vacuum passages of the fluid handling units, generates an urging force which aids in sealing adjacent fluid handling units together, and draws off any fluid that may leak from a fluid passage port. A sensor can be tapped into the vacuum line to sense whether any fluid has leaked from a fluid passage port.

34 Claims, 6 Drawing Sheets

MODULAR FLUID HANDLING ASSEMBLY AND MODULAR FLUID HANDLING UNITS WITH DOUBLE CONTAINMENT

BACKGROUND OF THE INVENTION

1. Field of the Invention

The present invention relates generally to a modular fluid handling assembly for conducting or distributing one or more fluids, and the individual modular fluid handling units comprising the assembly. More particularly, the invention relates to a modular fluid handling assembly, and individual units, with double-containment sealing capability. The invention further relates to a modular fluid handling assembly, and individual units, which allow for continuous monitoring of, and drawing off of, fluid leakage.

2. Description of the Related Art

In the semiconductor manufacturing industry, many hazardous fluids are used and must be carefully handled to prevent damage to equipment and injury to both the environment and production employees. Examples of such fluids include toxic and corrosive gases such as $SiH_4$, $BCl_3$, and HCl. These fluids must be kept as pure as possible during all aspects of the handling and supply, since any contact of the flow stream with a contaminant may result in defects in the manufactured products. These defects are usually not detected until after the manufacturing operation has been completed.

During the manufacturing process, certain fluids must be distributed to various locations in precise amounts. To accomplish this, the industry has used gas sticks, which comprise a plurality of discrete blocks connected together, and on which a plurality of external devices may be mounted. FIGS. 6a–6c depict one such conventional block.

The conventional block 90 includes a fluid passage 91, and associated ports 92, 92', through which a process fluid flows. The block 90 also includes external device passages 93, 94 and associated ports 95, 95', 96, 96', for fluid communication with an external device 97. When two or more blocks 90 are connected together, the process fluid flows through and among the blocks 90 and one or more external devices 97 by way of the internally bored passages 91, 93, 94 and associated ports 92, 92', 95, 95', 96, 96'. These discrete blocks 90 and external devices 97 require numerous junctions, which result in numerous opportunities for leakage.

To alleviate leakage between and among the discrete blocks 90 and external devices 97, the industry has used metallic compression seals 98 at junctions between the individual passage ports 92, 92', 95, 95', 96, 96'. However, these individual seals 98 are still subject to leakage. Even extremely small amounts of leakage can result in personnel injury, equipment damage, or manufacturing defects. Typically, these leaks are detected only by detecting product degradation or by removing the entire gas stick from the system and performing a conventional leak test.

SUMMARY OF THE PRESENT INVENTION

It is therefore a principal object of the present invention to provide a modular fluid handling assembly for conducting or distributing one or more fluids, and the individual modular fluid handling units comprising the assembly, with double-containment sealing to prevent leakage or contamination of the fluid.

Another object of the present invention is to provide a modular fluid handling assembly, and the individual modular fluid handling units comprising the assembly, with a negative pressure source continuously connected to a region between adjacent units to provide an improved seal connection therebetween.

Still another object of the present invention is to provide a modular fluid handling assembly, and the individual modular fluid handling units comprising the assembly, with a negative pressure source continuously connected to a region between adjacent units to draw off any fluid that may leak from a fluid passage port.

Yet another object of the present invention is to provide a modular fluid handling assembly including a detector for detecting leakage of fluid.

In one aspect of the present invention, a modular fluid handling assembly includes a plurality of fluid handling units. Each fluid handling unit includes a fluid passage and associated port, a vacuum passage and associated ports, a vacuum pressure source, and a containment seal. The fluid passage ports and vacuum passage ports of adjacent fluid handling units respectively communicate. The vacuum pressure source is in communication with the vacuum passages of the fluid handling units. The containment seal is disposed between adjacent fluid handling units and surrounds the communicating fluid passage ports and vacuum passage ports.

In a further aspect of the present invention a modular fluid handling unit includes a fluid passage, a vacuum passage, and a containment seal. The fluid passage extends through the unit and includes two fluid passage ports. The vacuum passage extends through the unit and includes a vacuum passage port proximate each fluid passage port. A containment seal surrounds the vacuum passage ports and proximate fluid passage ports.

In yet a further aspect of the present invention a modular fluid handling assembly includes a plurality of fluid handling units. Each fluid handling unit includes at least one fluid passage and an associated fluid passage port. A fluid passage port of one fluid handling unit communicates with a fluid passage port of an adjacent fluid handling unit. A primary seal is included between fluid passage ports of adjacent fluid handling units, and a secondary seal surrounds the primary seal. A means for applying a negative pressure source to a region between adjacent fluid handling units and between the primary and secondary seals is also included. The negative pressure applying means generates a force urging adjacent fluid handling units together.

These and other objects, aspects, advantages and features of the present invention will become more apparent to those skilled in the art when the following detailed description is read in conjunction with the accompanying drawings.

BRIEF DESCRIPTION OF THE DRAWINGS

In the following detailed description, reference will be made to the attached drawings in which:

FIG. 2b is a top plan view of the modular fluid handling unit of FIG. 2a.

FIG. 6b is a top plan view of the conventional fluid handling block of FIG. 6a.

DETAILED DESCRIPTION OF THE PREFERRED EMBODIMENTS

Figure 1:
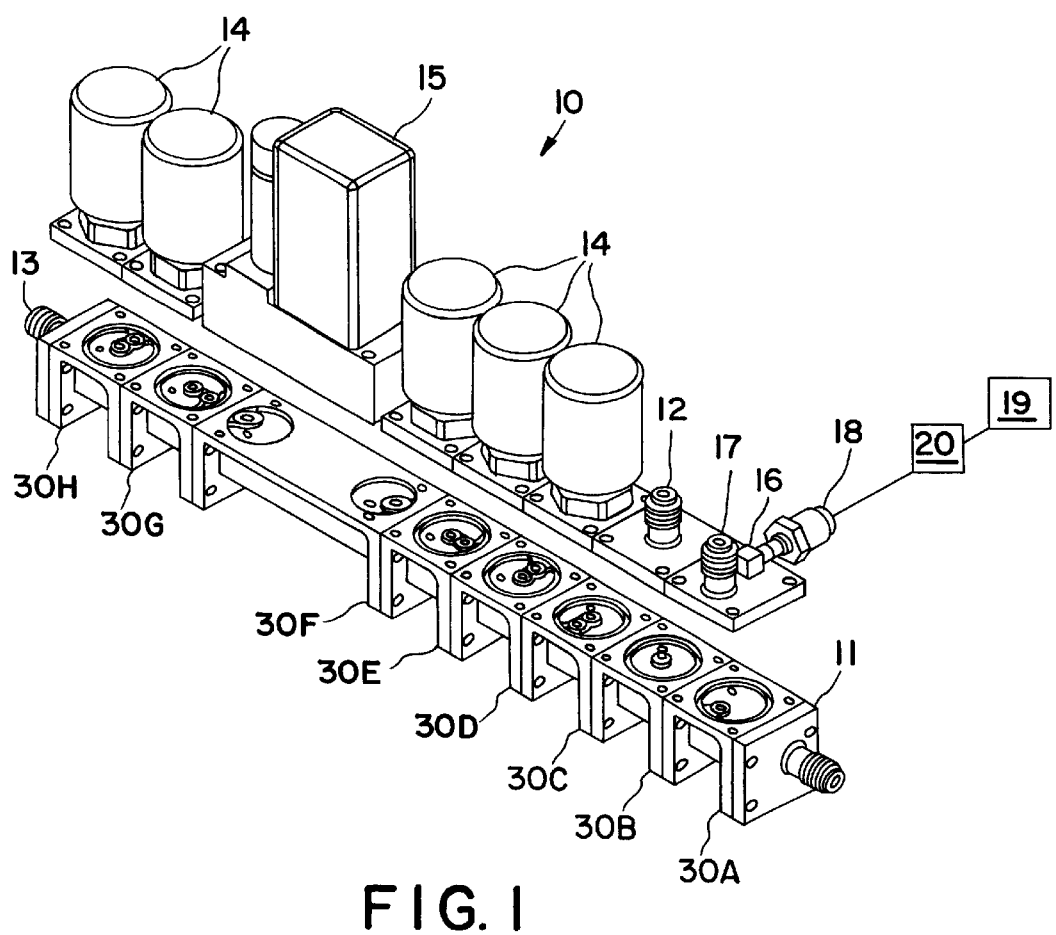
FIG. 1 is an exploded perspective view of a modular fluid handling assembly according to the present invention.
Figure 2A:
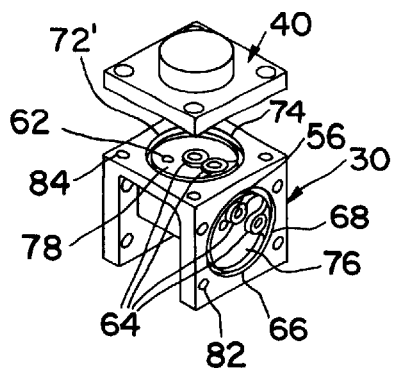
FIG. 2a is a perspective illustration of one embodiment of a modular fluid handling unit according to the present invention.
Figure 2B:
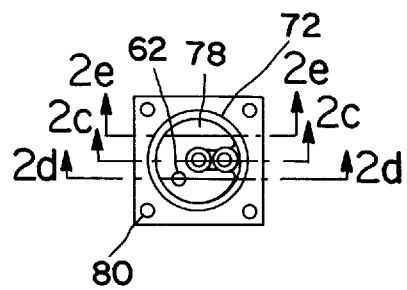
Figure 2C:
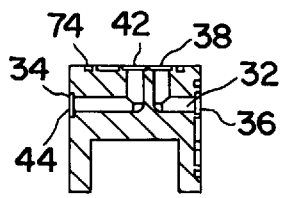
FIGS. 2c, 2d, and 2e are sectional views of the modular fluid handling unit of FIG. 2a along section lines 2c—2c, 2d—2d, and 2e—2e, respectively, of FIG. 2b.
Figure 2D:
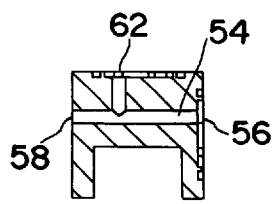
Figure 2E:
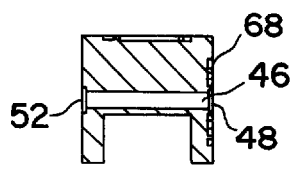
Figure 3A:
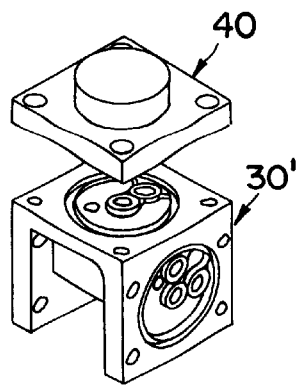
FIGS. 3a–3e, 4a–4e, and 5a–5e illustrate alternative embodiments of modular fluid handling units according to the present invention.
Figure 3B:
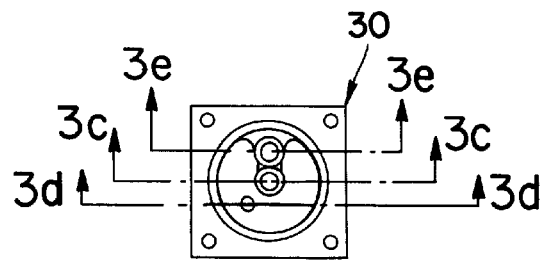
Figure 3C:
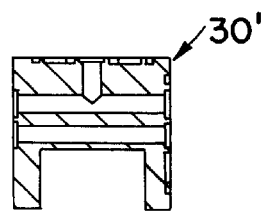
Figure 3D:
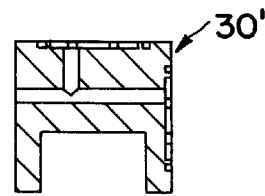
Figure 3E:
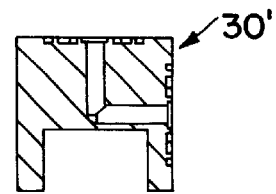
Figure 4A:
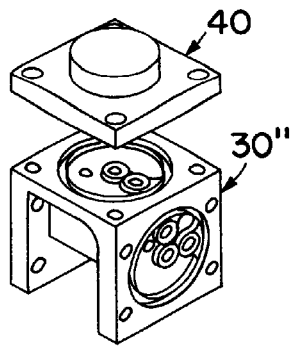
Figure 4B:
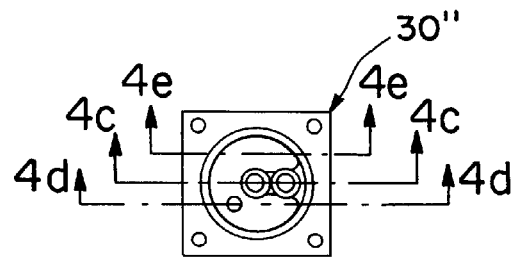
Figure 4C:
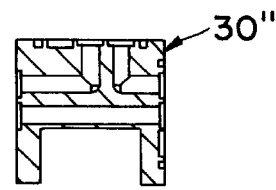
Figure 4D:
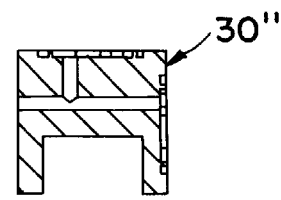
Figure 4E:
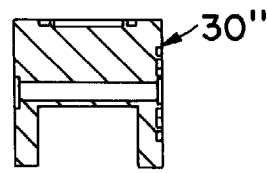
Figure 5A:
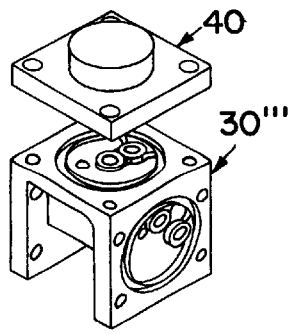
Figure 5B:
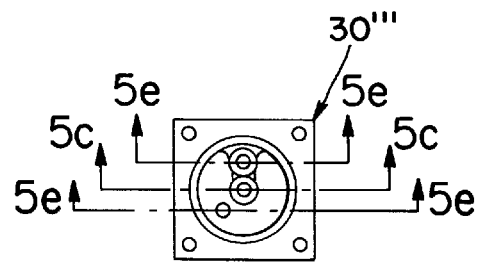
Figure 5C:
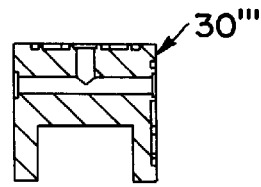
Figure 5D:
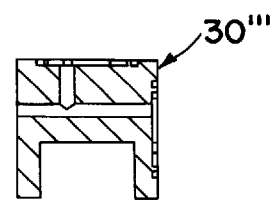
Figure 5E:
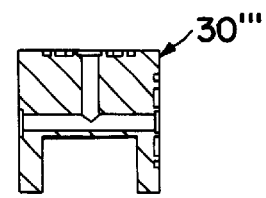
Figure 6A:
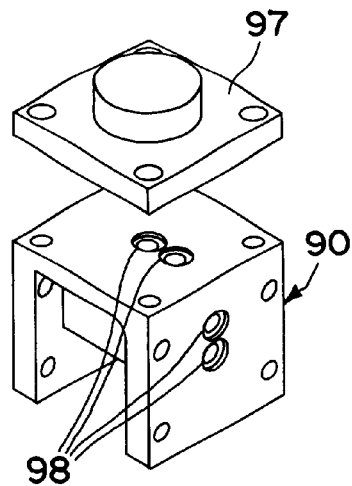
FIG. 6a is a perspective illustration of a conventional discrete fluid handling block.
Figure 6B:
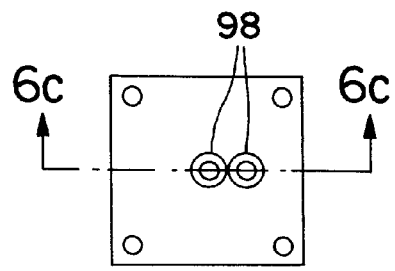
Figure 6C:
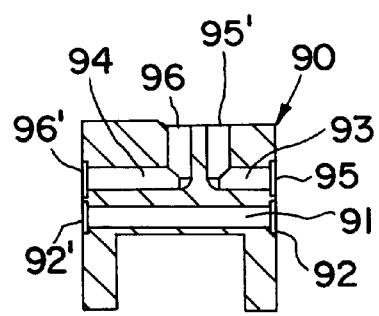
FIG. 6c is a sectional view of the conventional fluid handling block along section line 6c—6c of FIG. 6b.

FIG. 1 depicts an exploded view of a modular fluid handling assembly 10 according to one aspect of the present invention. The assembly depicted is formed of a plurality of modular fluid handling units 30A–30H and various external devices and connection units. The connection units can include fluid inlet connection units 11 and 12, fluid outlet connection unit 13, dual connection unit 16 or any other suitable connection. The external devices can include valves 14 and a mass flow controller 15. These types of external devices are not limited, however, and any other devices used in fluid handling, including filters and pressure gauges, for example, can be used. Dual connection unit 16 includes an inlet connection 17 and a vacuum connection 18. Vacuum connection 18 is connected to a vacuum pressure source 19, with a sensor 20 preferably included between vacuum connection 18 and vacuum pressure source 19.

The modular fluid handling system 10 will be further discussed below. However, referring now to FIGS. 2a–2e, a more detailed description of an individual modular fluid handling unit will first be given.

A modular fluid handling unit 30 includes external device fluid passages 32 and 34, inlet port 36, external device connection ports 38 and 42, and outlet port 44, to provide fluid connection to a connection unit or an external device, generally designated by 40. Ports 38 and 42 are preferably formed in a top face of unit 30, whereas ports 36 and 44 are disposed in opposite side faces. Alternatively, or in addition to external device passages 32, 34, the modular fluid handling unit 30 may include at least one fluid passage 46 that extends through the unit, with associated inlet 48 and outlet 52 ports on the opposing side faces.

A vacuum passage 54, including inlet 56 and outlet 58 vacuum passage ports disposed in the opposing side faces, extends through the unit 30. An additional vacuum passage port 62, in fluid communication with a branch of vacuum passage 54, is provided proximate fluid passage ports 38 and 42 in the top face.

A primary seal 64 is disposed at each fluid passage port to enhance fluid tight communication between adjacent fluid handling units or between a fluid handing unit and an attached external device or connection unit 40. Seals 64 may comprise an O-ring manufactured of any suitable material for providing sealing, but in a preferred embodiment are metal compression seals. Each seal 64 sits in a recess in a face of fluid handling unit 30 or external device or connection unit 40, with each recess surrounding a respective fluid port. When adjacent fluid handling units or a fluid handling unit and a connection unit are secured to one another, the primary seals 64 of corresponding ports mate and are compressed against one another to form the seal.

Containment seals are provided between each pair of contacting faces of adjacent fluid handling units 30 or between a fluid handling unit 30 and an external device or connector unit 40. In this embodiment, one containment seal 66 is provided to surround vacuum passage port 56 and the proximate fluid passage inlet ports 36 and 48. The containment seal 66 fits in a groove 68 formed in side face of fluid handling unit 30 to surround the vacuum passage port 56 and proximate fluid passage inlet ports 36 and 48. The depth of groove 68 is less than the width of containment seal 66, such that a portion of containment seal 66 protrudes beyond the side face of fluid handling unit 30. An additional containment seal 72, which fits in a groove 74 in the top face, surrounds external device connection ports 38 and 42 and associated vacuum passage port 62. The containment seals 66, 72 may comprise O-rings manufactured of any material suitable for providing sealing.

The vacuum passage ports 56, 62 are associated with respective vacuum channels 76, 78. Channel 76 is disposed in the side face within the region between the containment seal 66 and the fluid passage ports 36 and 48, whereas channel 78 is disposed in the top face within the region between containment seal 72 and fluid passage ports 38, 42. Each channel 76, 78 is formed as a contiguous recess in a face of fluid handling unit 30. The shape of the channels depicted in the illustrations is a C-shape; however, the channel shape is not so limited. Rather, the size and shape of each channel 76, 78 is selected to maximize the channel surface area for a given fluid passage port configuration. Designing the channels 76, 78 this way allows communication of vacuum pressure between adjacent units even if the vacuum passage channels of adjacent fluid handling units are not collocated. That is, when two fluid handling units 30 are secured to one another, the vacuum channel formed in one of the adjoining faces can act as a vacuum passage between the vacuum ports that are not adjacent one another. When a C-shaped channel is used, the vacuum ports must be positioned at a radius from the center of the face equal to the radius at which the vacuum channel is formed.

Thus, fluid handling units of varying designs can be placed adjacent each other, as long as the fluid passage ports of adjacent fluid handling units are collocated. By not limiting the positions of the vacuum passages and ports in each fluid handling unit, the number of possible fluid passage configurations is increased.

By providing vacuum channels 76, 78 between adjacent fluid handling units 30 or between a fluid handling unit and an external device or connection unit 40, the connection force between the units is increased. More particularly, the vacuum in a channel of a face of one unit acts on the face of the adjacent unit to urge the two faces together. By maximizing the surface area of the channels 76, 78, the urging force, for a given vacuum pressure, between adjacent units will be maximized.

Maximizing the size of the channel also increases the ability to draw away any fluid that may leak from a fluid passage port surrounded by the channel.

Preferably, only one vacuum channel and one containment seal are provided between adjoining faces of adjacent fluid handling units 30 or between adjoining faces of fluid handling unit 30 and an external device or connection unit 40. In order to maintain a standard, if the fluid handling units have ports in two side faces and the top face as shown in the embodiment of FIGS. 2a–2e, then a vacuum channel and a groove for the containment seal are provided in the top face and in only one of the opposing side faces of each fluid handling unit. No vacuum channel or containment seal groove are provided in the other side face or the adjoining face of an external device or connection unit.

Fastening devices 80 are used to fasten adjacent fluid handling units 30 together, and to fasten any external device or connection unit 40 to a fluid handling unit 30. The fastening devices 80 may be any type known to the ordinarily skilled artisan. In a preferred embodiment, the fluid handling units 30 and external devices or connection units 40 are bolted together via a plurality of through-holes 82, 84 formed in the units. In the preferred embodiment, the pattern and size of the external device through-holes 84 conform to SEMI 2871.1, a semiconductor manufacturing industry standard.

A modular fluid handling unit 30 can be manufactured in various sizes and geometric shapes. In the preferred embodiment, the units are blocks having generally cubical or rectangular shapes. The units can be manufactured from any material suitable for the fluid environment. In the preferred embodiment, the blocks are formed of stainless steel.

Various modifications to the fluid passages, vacuum passages, and associated ports can be made. Examples of various modifications are depicted in FIGS. 3a–3e, 4a–4e, and 5a–5e. The unit 30" of the embodiment of FIGS. 3a–3e include three fluid passages, two of which branch into the top face such that two separate fluid flows can be in communication with external device or connection unit 40. The fluid handling unit 30" in the embodiment of FIGS. 4a–4e includes two fluid through passages and two passages that communicate with the top face. The fluid handling unit 30''' in the embodiment of FIGS. 5a–5e includes two through passages that branch into separate ports on a top face. These variations and modifications are by no means inclusive. Indeed, a modular fluid handling unit according to the present invention may include only a single fluid passage, or any combination of fluid passages described herein.

Referring once again to FIG. 1, a modular fluid handling assembly 10 is formed by fastening together individual modular fluid handling units 30A–30H and external devices and connection units 11–16. The fluid handling units 30A–30H are selected to ensure that fluid passage ports of adjacent units are collocated. However, as explained above, because of the vacuum passage channel design, adjacent vacuum passage ports need not be collocated.

Once the system components have been fastened together, the vacuum pressure source 19 is connected to the vacuum pressure source connection 18, which communicates with vacuum passage 54 in unit 30B. The vacuum pressure is distributed through the vacuum passages 54 in each of fluid handling units 30A–30H to the vacuum channels between adjacent fluid handling units 30A–30H, and between the fluid handling units 30A–30H and the external devices and connection units 11–16. As a result, an urging force is created therebetween which aids in sealing between the fluid handling units and the external devices and connection units together. Moreover, the vacuum pressure source will draw away any fluid that may leak from a fluid passage port. The sensor 20 can be placed in the line extending from the vacuum pressure source connection 18 to the vacuum pressure source 19. Sensor 20 allows real-time, in-situ detection of any fluid that may leak from a fluid passage port. Sensor 20 can be any type known to the ordinarily skilled artisan for detecting a particular fluid flowing in the fluid passages. For example, sensor 20 can be a hydrogen mass spectrometer.

With the modular fluid handling units and the external devices and connection units connected in a desired configuration, processing fluid such as, for example, $SiH_4$, $BCl_3$, or $HCl$, can be controlled to reliably and safely flow through the fluid passages as designed.

It should be understood that the particular assembly depicted in FIG. 1 and described herein is only one illustrative example of the numerous assemblies which can be formed by an ordinarily skilled artisan practicing the present invention.

While preferred embodiments of the present invention have been illustrated in detail, it is apparent that modifications and adaptations of the preferred embodiments will occur to those skilled in the art. However, it will be expressly understood that such modifications and adaptations are within the spirit and scope of the present invention as set forth in the following claims.

What is claimed is:

1. A modular fluid handling assembly comprising:

a plurality of fluid handling units;

at least one fluid passage disposed in each fluid handling unit and having at least one fluid passage port, wherein a fluid passage port of one fluid handling unit communicates with a fluid passage port of an adjacent fluid handling unit;

a vacuum passage disposed in at least one of said fluid handling units and comprising at least two vacuum passage ports, each vacuum port being disposed proximate a fluid passage port, wherein a vacuum passage port of one unit communicates with a vacuum passage port of an adjacent unit;

a containment seal disposed between adjacent fluid handling units, wherein said containment seal surrounds one of said vacuum passage ports and a proximate fluid passage port of at least one of said adjacent fluid handling units; and a vacuum pressure source in fluid communication with said vacuum passage.

2. A modular fluid handling assembly according to claim 1, wherein adjacent fluid handling units are bolted together.

3. A modular fluid handling assembly according to claim 1, further comprising a primary seal disposed between communicating fluid passage ports of adjacent units.

4. A modular fluid handling assembly according to claim 1, wherein at least one of said fluid handling units comprises one of a sensor, a filter, a gauge and a flow control device.

5. A modular fluid handling assembly according to claim 1, each fluid handling unit comprises at,least one communication face in which at least one fluid passage port is disposed.

6. A modular fluid handling assembly according to claim 5, wherein at least one fluid passage port and a vacuum passage port are disposed in at least one communication face.

7. A modular fluid handling assembly according to claim 5, wherein an external device is mounted on one of said communication faces.

8. A modular fluid handling assembly according to claim 7, further comprising another containment seal disposed between said external device and said communication face.

9. A modular fluid handling assembly according to claim 8, wherein said external device comprises one of a sensor, a filter, a gauge and a flow control device.

10. A modular fluid handling assembly according to claim 1, wherein said containment seal comprises an O-ring.

11. A modular fluid handling assembly according to claim 1, wherein said vacuum passage port comprises a channel configured to allow communication of vacuum pressure between adjacent fluid handling units if adjacent vacuum passage ports are not collocated.

12. A modular fluid handling assembly according to claim 11, wherein said channel has a surface area that is maximized for a fluid passage port configuration.

13. A modular fluid handling assembly according to claim 12, further comprising a sensor communicating with said vacuum passage for sensing whether any fluid has leaked from a fluid passage port.

14. A modular fluid handling assembly according to claim 13, wherein said sensor comprises a gas spectrometer.

15. A modular fluid handling assembly according to claim 11, wherein said channel is configured in a C-shape.

16. A modular fluid handling assembly according to claim 1, wherein said vacuum pressure source draws away any fluid that may leak from a fluid passage port.

17. A modular fluid handling assembling according to claim 1, wherein said vacuum pressure source generates a force urging adjacent fluid handling units together.

18. A modular fluid handling assembly according to claim 1, wherein at least one of said plurality of fluid handling units comprises a fluid handling block.

19. A modular fluid handling unit comprising:
  at least one fluid passage extending through said unit, each said fluid passage comprising at least two fluid passage ports;
  a vacuum passage extending through said unit and comprising at least two vacuum passage ports, with a vacuum passage port proximate each fluid passage port; and
  at least one containment seal, each containment seal surrounding one of said vacuum passage ports and a proximate fluid passage port.

20. A modular fluid handling unit according to claim 19, further comprising fastening means for fastening said fluid handling unit to another fluid handling unit.

21. A modular fluid handling unit according to claim 19, further comprising a primary seal surrounding each said fluid passage port.

22. A modular fluid handling unit according to claim 19, wherein one of said at least one fluid passage is configured to provide fluid communication to an external device.

23. A modular fluid handling unit according to claim 19, further comprising a plurality of communication faces in which said fluid and vacuum passage ports are disposed.

24. A modular fluid handling unit according to claim 23, wherein at least one of said fluid passage ports and one of said vacuum passage ports are disposed in each of said communication faces.

25. A modular fluid handling unit according to claim 19, wherein said containment seal comprises an O-ring.

26. A modular fluid handling unit according to claim 19, wherein at least one of said vacuum passage ports comprises a channel configured to allow communication of vacuum pressure between adjacent fluid handling units if adjacent vacuum passage ports are not collocated.

27. A modular fluid handling assembly according to claim 26, wherein said channel has a surface area that is maximized for a fluid passage port configuration.

28. A modular fluid handling assembly according to claim 26, wherein said channel is configured in a C-shape.

29. A modular fluid handling unit according to claim 19, wherein said modular fluid handling unit is configured as a fluid handling block.

30. A modular fluid handling unit according to claim 19, wherein said vacuum passage communicates with a gas spectrometer.

31. A modular fluid handling assembly comprising:
  a plurality of fluid handling units, each fluid handling unit comprising at least one fluid passage and at least one fluid passage port, a fluid passage port of one of said fluid handling units communicating with a fluid passage port of an adjacent fluid handling unit;
  a primary seal disposed between fluid passage ports of said adjacent fluid handling units;
  a secondary seal surrounding said primary seal; and
  means for applying a negative pressure source to a region defined between said adjacent fluid handling units and between said primary and secondary seals,
  wherein said negative pressure applying means generates a force urging said adjacent fluid handling units together.

32. A modular fluid handling assembly according to claim 31, wherein said negative pressure applying means draws off any fluid that may leak past said primary seal.

33. A modular fluid handling assembly according to claim 32, further comprising sensing means for sensing any fluid that leaks past said primary seal and has been drawn off by said negative pressure applying means.

34. A modular fluid handling assembly according to claim 33, wherein said sensing means comprises a gas spectrometer.

* * * * *

UNITED STATES PATENT AND TRADEMARK OFFICE
CERTIFICATE OF CORRECTION

PATENT NO. : 6,298,881 B1
DATED : October 9, 2001
INVENTOR(S) : Curran et al.

Page 1 of 1

It is certified that error appears in the above-identified patent and that said Letters Patent is hereby corrected as shown below:

<u>Column 3,</u>
Line 49, "fluid tight" should read -- fluid-tight --.
Line 50, "handing" should read -- handling --.

<u>Column 5,</u>
Line 18, "unit 30''" should read -- unit 30' --.
Line 19, "include" should read -- includes --.

<u>Column 6,</u>
Line 42, "each" should read -- wherein each -- and "at,least" should read -- at least --.

<u>Column 7,</u>
Line 12, "assembling" should read -- assembly --.

Signed and Sealed this

Thirtieth Day of April, 2002

Attest:

Attesting Officer

JAMES E. ROGAN
Director of the United States Patent and Trademark Office